United States Patent
Popov et al.

(10) Patent No.: US 7,618,915 B2
(45) Date of Patent: *Nov. 17, 2009

(54) COMPOSITE CATALYSTS SUPPORTED ON MODIFIED CARBON SUBSTRATES AND METHODS OF MAKING THE SAME

(75) Inventors: Branko N. Popov, Columbia, SC (US); Nalini Subramanian, Kennesaw, GA (US); Hector R. Colon-Mercado, Columbia, SC (US)

(73) Assignee: University of South Carolina

( * ) Notice: Subject to any disclaimer, the term of this patent is extended or adjusted under 35 U.S.C. 154(b) by 239 days.

This patent is subject to a terminal disclaimer.

(21) Appl. No.: 11/800,978

(22) Filed: May 8, 2007

(65) Prior Publication Data

US 2008/0113859 A1     May 15, 2008

Related U.S. Application Data

(60) Provisional application No. 60/798,606, filed on May 8, 2006.

(51) Int. Cl.
*B01J 31/00* (2006.01)
*B01J 21/18* (2006.01)

(52) U.S. Cl. .................. 502/180; 502/150; 502/153; 502/173; 502/182; 502/184; 502/185

(58) Field of Classification Search .............. 502/150, 502/153, 173, 180, 182, 184, 185
See application file for complete search history.

(56) References Cited

U.S. PATENT DOCUMENTS

| | | | | |
|---|---|---|---|---|
| 4,835,074 A | * | 5/1989 | Bolster et al. | 429/43 |
| 4,970,189 A | * | 11/1990 | Tachibana | 502/183 |
| 5,504,050 A | * | 4/1996 | Hayden | 502/180 |

OTHER PUBLICATIONS

Hillenbrand et al. "The Platinum-on-Carbon Catalyst System for Hydrogen Anodes", Journal of the Electrochemical Society, vol. 112, No. 3, pp. 245-249 (1965).

Ross et al. "The Valence Band Structure of Highly Dispersed Platinum", Journal of Catalysts, vol. 32, pp. 163-165 (1974).

Ehrburger et al., "Dispersion of Iron Phthalocyanine on Carbon Surfaces", Journal of Colloid and Interface Science, vol. 91, No. 1, pp. 151-159 (1983).

Jaouen et al. "Oxygen Reduction Catalysts for Polymer Electrolyte Fuel Cells from the Pyrolysis of Iron Acetate Adsorbed on Various Carbon Supports", Journal of Physical Chemistry B, vol. 107, No. 6, pp. 1376-1386 (2003).

Roy et al. "Direct Methanol Fuel Cell Cathodes with Sulfur and Nitrogen-Based Carbon Functionality", Journal of the Electrochemical Society, vol. 143, No. 10, pp. 3073-3079 (1996).

(Continued)

*Primary Examiner*—Patricia L Hailey
(74) *Attorney, Agent, or Firm*—Dority & Manning, P.A.

(57) ABSTRACT

A method of producing a composite carbon catalyst is generally disclosed. The method includes oxidizing a carbon precursor (e.g., carbon black). Optionally, nitrogen functional groups can be added to the oxidized carbon precursor. Then, the oxidized carbon precursor is refluxed with a non-platinum transitional metal precursor in a solution. Finally, the solution is pyrolyzed at a temperature of at least about 500° C.

20 Claims, 14 Drawing Sheets

OTHER PUBLICATIONS

Wang et al. "Effect of the Pre-Treatment of Carbon Black Supports on the Activity of Fe-Based Electrocatalysts for the Reduction of Oxygen", Journal of Physical Chemistry, vol. 103, No. 12, pp. 2042-2049 (1999).

Brezina et al. "Study of Catalysts for Fuel Cell Exectrodes: Evaluation of Carbon Activity with Respect to Electrochemical Reduction of Oxygen and Decomposition of Hydrogen Peroxide", Collection Czechoslovakia Chemistry Communication, vol. 33, pp. 2363-2369 (1968).

H.P. Boehm, "Some Aspects of the Surface Chemistry of Carbon Blacks and Other Carbons", Carbon, vol. 32, No. 5, pp. 759-769 (1994).

Chen et al. "Acid/Base-Treated Activated Carbons: Characterization of Functional Groups and Metal Adsorptive Properties", Langmuir, vol. 20, No. 6, pp. 2233-2242 (2004).

Kinoshita et al. "Potentiodynamic Analysis of Surface Oxides on Carbon Blacks", Carbon, vol. 11, pp. 403-411 (1973).

Shim et al. "Effect of Modification with $HNO_3$ and NaOH on Metal Adsorption by Pitch-Based Activated Carbon Fibers", Carbon, vol. 39, pp. 1635-1642 (2001).

Carrasco-Marin et al. "Water Adsorption on Activated Carbons with Different Degrees of Oxidation", Journal of Chemical Society, Faraday Trans., vol. 93, No. 12, 2211-2215 (1997).

Garten et al. "The Quinone-Hydroquinone Character of Activated Carbon and Carbon Black" Australian Journal of Chemistry, vol. 8, pp. 68-95 (1953).

Radoslav Adzic, "Recent Advances in the Kinetics of Oxygen Reduction", Electrocatalysis, Editors J. Lipkowski, P.N. Ross, Wiley-VCH, Inc. (1998).

J.B. Donnet, "The Chemical Reactivity of Carbons", Carbon, vol. 6, pp. 161-176 (1968).

Jaouen et al. "Fe-Based Catalysts for Oxygen Reduction in PEMFCs: Importance of the Disordered Phase of the Carbon Support", Journal of the Electrochemical Society, vol. 153, No. 4, pp. A689-A698 (2006).

Yeager, "Electrocatalysts for $O_2$ Reduction", Electrochimica Acta, vol. 29, No. 11, pp. 1527-1537 (1984).

Wiesener, "$N_4$-Chelates as Electrocatalyst for Cathodic Oxygen Reduction", Electrochimica Acta, vol. 31, No. 8, pp. 1073-1078 (1986).

* cited by examiner

US 7,618,915 B2

COMPOSITE CATALYSTS SUPPORTED ON MODIFIED CARBON SUBSTRATES AND METHODS OF MAKING THE SAME

PRIORITY INFORMATION

The present application claims priority to U.S. Provisional Patent Application No. 60/798,606 filed on May 8, 2006, naming Popov, et al. as inventors, which is herein incorporated by reference in its entirety.

GOVERNMENT SUPPORT CLAUSE

The present invention was developed under Grant DE-FC36-03Go13108 from the Department of Energy. The government retains certain rights in this invention.

BACKGROUND OF INVENTION

A major impediment to the commercialization of proton exchange membrane (PEM) fuel cells is the low activity of electrocatalysts for the oxygen reduction reaction (ORR). Platinum (Pt) is considered the best cathode catalyst toward four-electron reduction of oxygen to water in acidic environments. It also shows the lowest overpotential and the highest stability. However, Pt remains an expensive metal of low abundance, and it is thus of great importance to find Pt-free alternatives for PEM fuel cells.

There has been a considerable research on: (i) ruthenium (Ru)-based chalcogenides (e.g. chevrel-phase type $Mo_4Ru_2Se_8$ and amorphous $Mo_xRu_ySe_z$ and $Ru_xSe_y$), (ii) porphyrin-based macrocyclic compounds of transition metal (e.g. cobalt phthalocyanines and iron tetramethoxyphenyl porphyrin), (iii) vacuum-deposited cobalt and iron compounds (e.g. Co—C—N and Fe—C—N) and (iv) metal carbides, nitrides and oxides (e.g. $FeC_x$, $TaO_xN_y$, $MnO_x/C$). However, none of the above catalysts fully meet the requirements of electrocatalysts for ORR in PEM fuel cells due to the following deficiencies: (i) low catalytic activity, (ii) poor stability, (iii) low selectivity toward four-electron reduction of oxygen to water (large amount of hydrogen peroxide >5%) and (iv) high electronic resistance. Also, they are typically synthesized through complex routes with expensive precursors.

As such, a need currently exists for a low-cost, easily manufactured carbon-based catalyst having high activity, selectivity, and stability for ORR.

SUMMARY OF THE INVENTION

Objects and advantages of the invention will be set forth in part in the following description, or may be obvious from the description, or may be learned through practice of the invention.

In general, the present disclosure is directed toward a method of producing a composite carbon catalyst. The method includes oxidizing a carbon precursor (e.g., carbon black). Optionally, nitrogen functional groups can be added to the oxidized carbon precursor. Then, the oxidized carbon precursor is refluxed with a non-platinum transitional metal precursor in a solution. Finally, the solution is pyrolyzed at a temperature of at least about 500° C.

Other features and aspects of the present invention are discussed in greater detail below.

BRIEF DESCRIPTION OF FIGURES

A full and enabling disclosure of the present invention, including the best mode thereof to one skilled in the art, is set forth more particularly in the remainder of the specification, which includes reference to the accompanying figures, in which.

DETAILED DESCRIPTION OF PREFERRED EMBODIMENTS

Figure 1A:
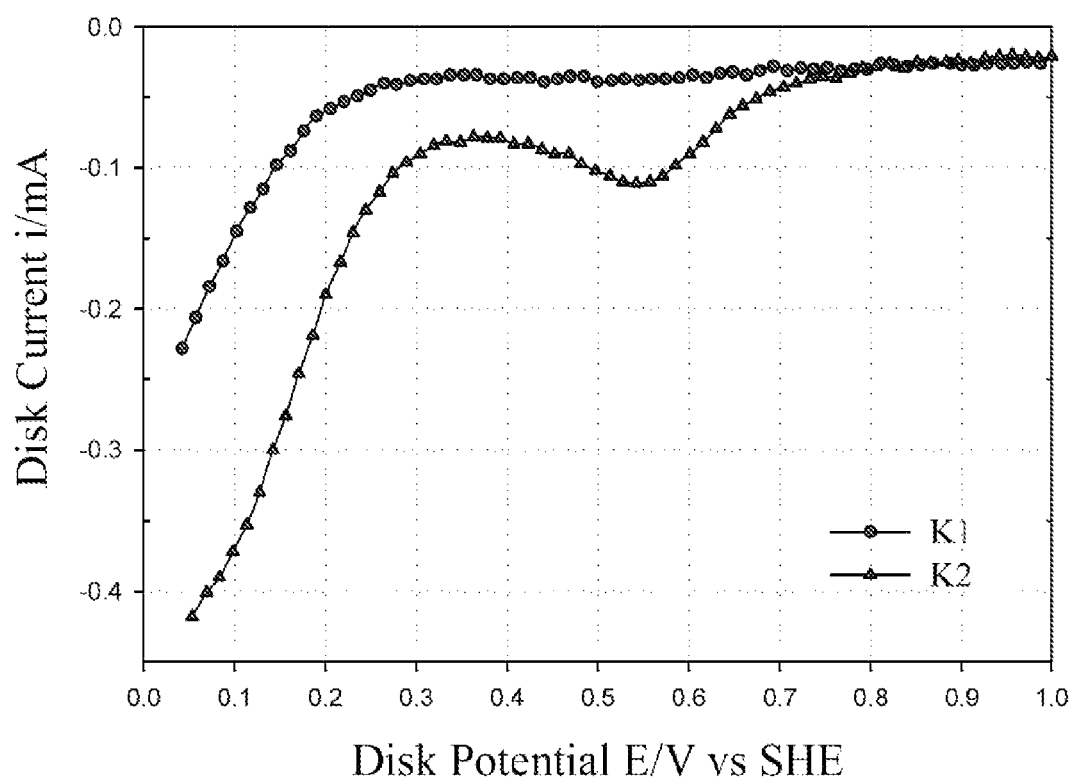
FIG. 1a is a polarization curve of K1 and K2 in 0.5 M $H_2SO_4$ solution saturated with $O_2$. Scan rate 5 mVs$^{-1}$, rotation rate 900 rpm.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

In general, the present disclosure is directed to a novel carbon composite catalyst and the methods of making the same. As a result, nano-sized transition metals can be utilized as a catalyst for formation of nitrogen-rich active reaction sites for ORR. The optimized carbon composite catalyst shows an onset potential for ORR as high as 0.87 V(NHE) which is comparable to that of a conventional platinum catalyst. The optimized catalyst produces no hydrogen peroxide ($H_2O_2$) during ORR in comparison with 1 to 2% $H_2O_2$ on a platinum catalyst. The fuel cell test showed the current densities of 1.1 A cm$^{-2}$ at 0.4 V and 2.3 A cm$^{-2}$ at 0.2 V for a catalyst loading of 6 mg cm$^{-2}$. The optimized catalyst showed no degradation of fuel cell performance even for 350 h of continuous operation. The catalyst of the present disclosure can be utilized as a cathode electrocatalyst in a proton exchange membrane fuel cell. Such a fuel cell could be utilized for various applications, including power sources for electric vehicles. In such electric vehicles, high power output and stability of fuel cells are of great importance, and the cathode catalyst of the present disclosure is advantageous in that regard.

In one embodiment, the synthesis process of the composite catalyst involves the following: (i) preparation of metal-free catalysts using a carbon activation methodology and (ii) preparation of carbon composite catalysts (deposition of metal and nitrogen precursors on the metal-free catalyst support, followed by post-treatments). As such, the present invention can utilize the highly active metal-free catalyst as a support for carbon composite catalysts and the nano-sized transition metal as a catalyst for formation of nitrogen-rich active reaction sites for ORR.

In most embodiments, the carbon precursor for the composite catalyst is carbon black. Suitable examples of carbon black available commercially are those sold under the trade names Vulcan XC-72 (available from Cabot Corp., Alpharetta, Ga.), Ketjen black EC 300 J (available from Lion Akzo Co., Ltd.), and Black Pearl 2000 (available from Cabot Corp., Alpharetta, Ga.). Although the present invention is generally disclosed with reference to carbon black, any other suitable carbon precursor can be used for the composite catalyst. For example, other types of amorphous carbon can be utilized as the carbon precursor.

Although not required, the carbon precursor is preferably washed with an acid to remove any metal impurities present in the carbon precursor prior to any reaction. For example, the carbon precursor can be washed in an aqueous solution of hydrochloric acid (HCl). Then, the carbon precursor can be washed with distilled water to remove any acid residue (e.g., to remove any chloride residue).

As an initial step in the present invention, the carbon precursor is oxidized to activate the carbon black. In one embodiment, the carbon precursor is oxidized with a solution of nitric acid ($HNO_3$). For example, the carbon precursor can be combined to an aqueous solution of nitric acid and refluxed for a period of time to allow for the desired rate of oxidation. The amount of oxidation of the carbon precursor can be controlled by the concentration of the nitric acid solution and the length of time the carbon precursor is allowed to react within the solution. The nitric acid solution can be an aqueous solution having a concentration of up to about 90% by weight, such as from about 50% to about 80% by weight. In one embodiment, the carbon precursor can be refluxed within a solution containing nitric acid for at least 10 hours, such as from about 5 to about 9 hours.

Although nitric acid is disclosed as the oxidizing agent, it is not intended to limit the present invention to the use of nitric acid. Of course, any other suitable oxidizing agent can be utilized within the present invention. Through oxidation of the carbon precursor, oxygen functional groups are introduced on the surface of the carbon precursor. For instance, the oxygen functional groups can include quinone groups, although other types of oxygen function groups can be present (e.g., hydroxyl groups, carboxylic acids, etc.).

No matter the oxidizing agent utilized, nitrogen functional groups can optionally be added to the oxidized carbon precursor. Nitrogen functional groups can be added via a polymerization process of nitrogen donor followed by high-temperature pyrolysis. For example, a nitrogen source can be polymerized to yield a formaldehyde-type compound. Suitable nitrogen sources include, without limitation, melamine, urea, thio-urea, and selenourea. Upon polymerization, these nitrogen sources yield, respectfully, melamine formaldehyde, urea formaldehyde, thio-urea formaldehyde, and selenourea formaldehyde. The polymerized carbon-nitrogen precursor is then subjected to an inert atmosphere at elevated temperatures in order to incorporate and stabilize the nitrogen functional groups in the carbon matrix through pyrolysis. For instance, the elevated temperature can be greater than about 500° C., such as from about 600° C. to about 1000° C. The pyrolysis can last for at least an hour, and even up to a day. Of course, the temperature and length of pyrolysis can be varied to achieve desired results.

It should be understood by one skilled in the art that the activity, selectivity, and stability of the catalyst can be optimized as a function of the surface oxygen group, the nitrogen content, and the precursor. Likewise, the carbon support porosity, pore size, and pore distribution can affect the catalyst performance. Additionally, a non-metal additive (e.g., S, Se, Te, and the like) can be added to any of the above steps to vary the performance of the carbon precursor, and the resulting catalyst.

Finally, the oxidized carbon precursor, with or without nitrogen functional groups, (collectively referred to as the "activated carbon precursor") is combined with a metal material to form the carbon composite catalyst. A non-Pt metal precursor is combined with the activated carbon precursor to form the carbon composite catalyst. Suitable non-Pt metal precursors can include cobalt (Co), iron (Fe), chromium (Cr), copper (Cu), nickel (Ni), vanadium (V), and other suitable transition metals.

Typically, the metal precursor is provided as a chelate. Metal chelates can be formed by combining the metal with chelating agent (e.g., ethylenediamine tetraacetic acid, ethylene diamine, propylene diamine, etc.). Specific metal chelates that could be used to form the carbon composite catalyst include, but are not limited to, cobalt hexahydrate, iron sulfate heptahydrate, cobalt ethylene diamine, and combinations thereof.

In one particular embodiment, the metal precursor can have a structure with the formula $MN_4$, wherein M is the metal and N is the nitrogen atom chelated with the metal, though the nitrogen is bonded to another molecule. For example, the metal precursor can be cobalt ethylene diamine, which has the $MN_4$ structure. Cobalt ethylene diamine can be prepared by adding stoichiometric amounts of ethylene diamine to cobalt nitrate under stirring conditions in a solvent (e.g., ethanol). Alternatively, the metal precursor can be cobalt propylene diamine. Again, though these metal precursors are disclosed with reference to cobalt, any other suitable non-Pt transitional metal may be used.

No matter the metal precursor composition, the metal precursor can be included within a solution such that the metal concentration is up to about 50% by weight, such as from about 10% to about 40% by weight. In one embodiment, for instance, the metal can be in a concentration of from about 20% to about 40% by weight.

To add the metal precursor to the oxidized carbon precursor, the metal precursor and the oxidized carbon precursor can be combined in a solution (e.g., solution, dispersion, mixture, emulsion, etc.) and refluxed for a period of time (e.g., at least about an hour). The solvent for the reflux solution can be any suitable solvent, such as an alcohol (e.g., ethanol, propanol, methanol, isopropanol, butanol, etc.), an ether, and the like.

Once refluxed, the solution can be pyrolyzed at elevated temperatures in an inert atmosphere. For example, the solution can be pyrolyzed at a temperature of greater than about 500° C., such as from about 600° C. to about 1000° C. The inert atmosphere can be formed from nitrogen gas, helium gas, argon gas, and the like.

If desired, any free metal on the carbon surface can be washed off by dissolving them in an acidic solution, such as hydrochloric acid (HCl) or sulphuric acid ($H_2SO_4$). Then, the metal-carbon solution may be pyrolyzed again.

EXAMPLES

A1: Catalyst Preparation:

Commercially available carbon blacks, namely Ketjen Black EC 300 J, Vulcan XC-72 and Black Pearl 2000, were pre-washed with 6 M HCl to dematerialize the carbon of any metal impurities. This carbon was then washed in distilled water to remove any chloride impurities. The pre-washed carbon was subjected to oxidation in 70% $HNO_3$ for 7 h under reflux and then washed in distilled water, followed by drying in an oven at 75° C. to obtain oxidized carbon. For brevity, as received Ketjen Black EC 300J, Vulcan XC-72 and Black Pearl 2000 are denoted as K, V, and B; HCl treated carbons as K1, V1 and B1; and $HNO_3$ treated carbons as K2, V2 and B2. Both oxidized carbon (e.g., K2) and un-oxidized carbon (e.g., K1) were loaded with Co-chelate complex (denoted as CoEDA). The CoEDA (Cobalt ethylene diamine) chelate gives rise to the simplest $MN_4$ structure among the chelates studied. This complex was synthesized by adding stoichiometric amounts of ethylene diamine to cobalt nitrate under stirring conditions in ethanol. The cobalt complex synthesized was dispersed on carbon in ethanol solvent under reflux conditions for 4 h. The loading of Co with respect to carbon is 20%. This loading was kept constant for all the samples synthesized with Co. The carbon loaded with the cobalt complex was dried in a rotary evaporator at 80° C. under vacuum. This dried sample was subjected to heat treatment at 800° C. in Ar atmosphere for 1 h. For comparison studies and to elucidate the effect of cobalt, carbon loaded with metal-free ethylene diamine was prepared under similar conditions and denoted as K1-EDA(HT) and K2-EDA(HT) on un-oxidized and oxidized carbon supports, respectively.

A2: Electrochemical Characterization:

Electrochemical characterizations were performed in a single-compartment, three-electrode cell. A rotating ring disk electrode from Pine Instruments with a glassy carbon disk (5 mm OD) and Pt ring (5.52 mm ID, 7.16 OD) was used as the working electrode. Platinum wire was used as the counter electrode. A standard $Hg/HgSO_4$ electrode was used as the reference electrode. The potentials presented in this study are referred with respect to Standard Hydrogen Electrode (SHE). The electrocatalyst was applied to the disk electrode in the form of an ink. 8 mg of the prepared electrocatalyst was suspended in 1 ml of isopropyl alcohol and ultrasonically blended for 10 minutes. 15 µl of this suspension is applied on the disk electrode in steps of 5 µl, with drying after each addition. 5 µl of Nafion solution (1:10:10:5 wt % Nafion:water:isopropyl alcohol) was added on top of the former film. 0.5 M $H_2SO_4$ was used as the electrolyte in all studies. Initially, the solution was purged with nitrogen and Cyclic Voltammograms (CVs) were recorded by scanning the disk potential from 1.04 V to 0.04 V vs. SHE at a scan rate of 5 $mVs^{-1}$. CVs recorded at 5 $mVs^{-1}$ in nitrogen atmosphere were used to obtain the background capacitive currents. For all electrochemical measurements, the ring potential was maintained at 1.2 V vs. SHE to oxidize any peroxide produced. Before the measurement of oxygen reduction currents, the electrolyte solution was purged with oxygen for 15 minutes. A CV was recorded in this oxygen saturated electrolyte, followed by linear sweep voltammograms at different rotation rates of the RRDE for disk potentials from 1.04 V to 0.04 V vs. SHE at a scan rate of 5 $mVs^{-1}$. All measurements were taken using a bipotentiostat (Model AFRDE from Pine Instruments).

A3: Physical and Surface Characterization:

The particle size of the catalyst was determined using Transmission Electron Microscopy (TEM, Hitachi H-8000 model). Surface analysis of the catalyst was performed by X-ray photoelectron spectroscopy (XPS). Experiments were carried out in a stainless steel ultrahigh vacuum chamber (Leybold) with a base pressure $\leq 1\times10^{-9}$ Torr which has been described in more detail elsewhere. The chamber is equipped with a single-channel hemispherical energy analyzer (Leybold LA10) and Al Kα anode X-ray source (1486.6 eV), as well as a load lock chamber for fast sample introduction. The powdered samples were loaded onto conductive, double-sided silver tape (Structure Probe, Inc.) for the XPS experiments. For each sample, the Co (2p), C(1s), N(1s) and O(1s) regions were collected with a step size of 0.05 eV, dwell time of 0.2 s and pass energy of 50 eV, and were averaged over 10 scans. Lower resolution survey scans were collected with a step size of 1.0 eV, dwell time of 0.2 s, and pass energy of 50 eV, and were averaged over 4 scans.

A4: Significance of Surface Oxygen Groups

Figure 1B:
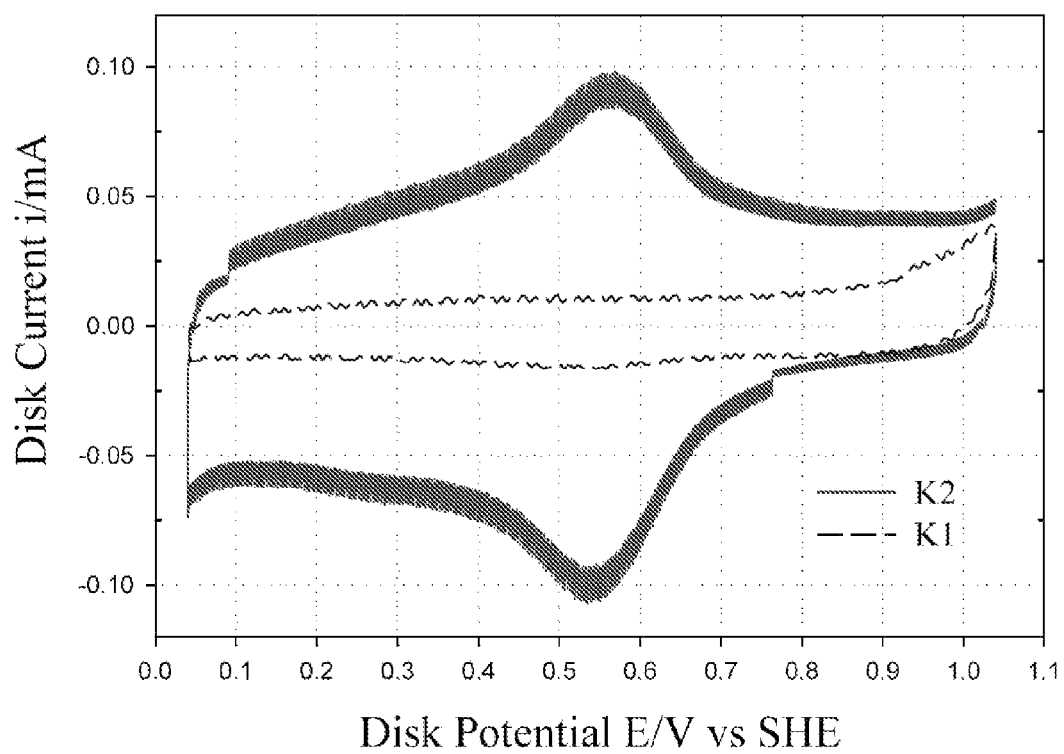
FIG. 1b is a typical cyclic voltammograms of K1 and K2 in 0.5 M $H_2SO_4$ saturated with $N_2$. Scan rate 5 mVs$^{-1}$, rotation rate 0 rpm.
Figure 2A:
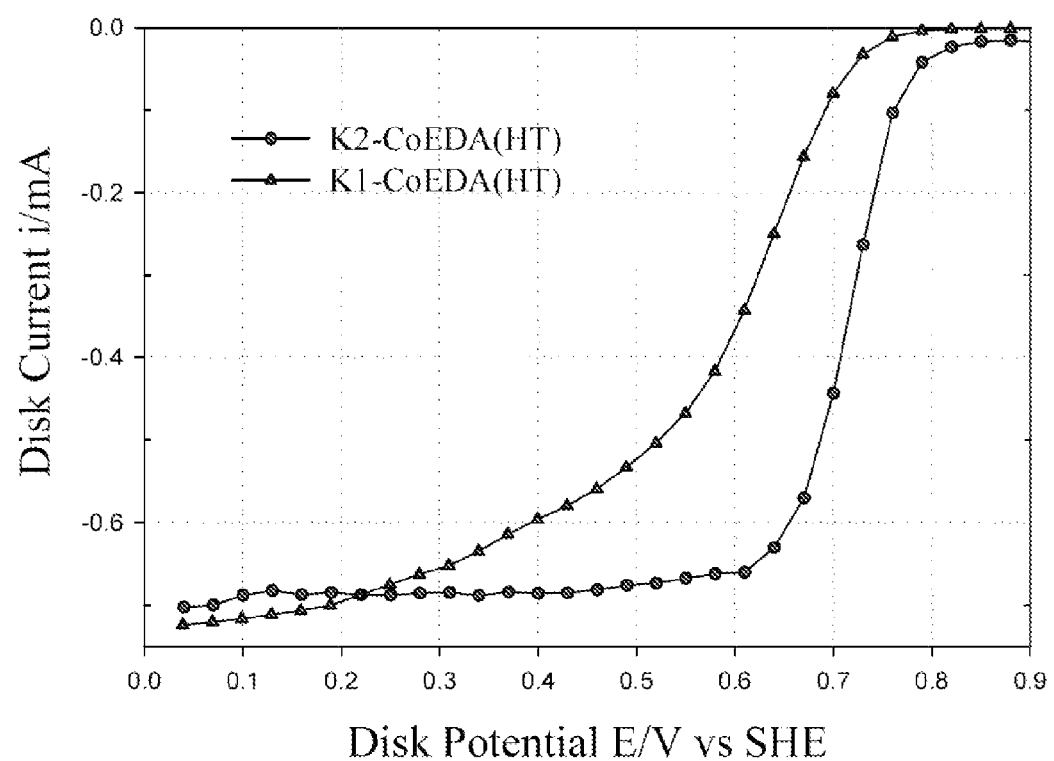
FIG. 2 is a polarization curve of heat treated CoEDA samples on oxidized and un-oxidized carbons for oxygen reduction in 0.5 M $H_2SO_4$ solution saturated with $O_2$. a) Disk currents. b) Ring currents. Scan rate 5 mVs$^{-1}$, rotation rate 900 rpm.
Figure 2B:
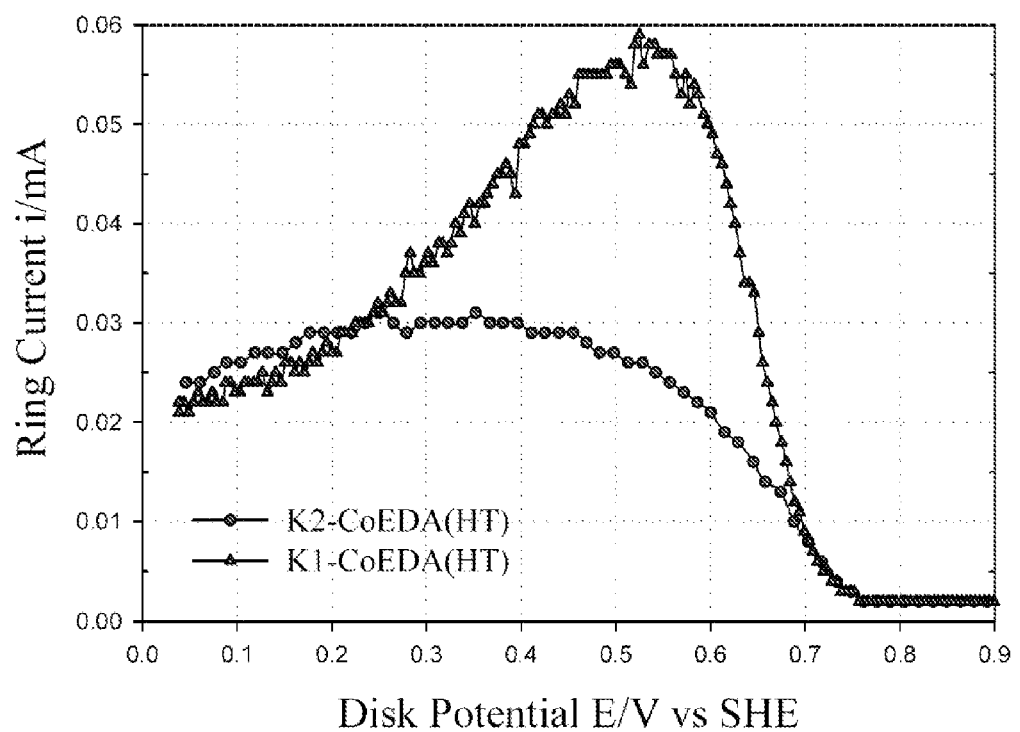

The un-oxidized K1 and oxidized K2 bare carbon supports were tested initially for their activity for oxygen reduction. FIG. 1a illustrates a typical polarization curve obtained on a rotating disk electrode for electrochemical reduction of molecular oxygen in 0.5 M $H_2SO_4$. It can be seen that un-oxidized carbon K1 has negligible activity to oxygen reduction. However, with the introduction of surface oxygen groups by $HNO_3$ treatment, the activity of the carbon increases. Oxidized carbon K2, shows about 100 mV less activation overpotential for oxygen reduction reaction compared to K1. Electrochemical analysis indicates that carbon oxidation in nitric acid introduces quinone type oxygen groups on the carbon surface. The nature of the surface functional groups generated with $HNO_3$ treatment was studied using cyclic voltammograms. The CV's were performed on un-oxidized (K1) and oxidized (K2) carbon supports. FIG. 1b illustrates the cyclic voltammograms obtained for carbons K1 and K2 in 0.5 M $H_2SO_4$ saturated with $N_2$. The un-oxidized carbon (K1) does not exhibit any characteristic peak. $HNO_3$ oxidized carbon (K2) exhibits well-defined redox peaks at 0.55 V vs. SHE. These characteristic peaks are associated with the quinone-hydroquinone redox couple. The effect of oxidation on the dispersion and the activity of cobalt chelate complexes was studied by testing the samples of heat treated CoEDA on oxidized carbon K2 and on un-oxidized carbon K1. The results are shown in FIG. 2. The electrocatalyst K2-CoEDA(HT) showed better activity than K1-CoEDA (HT). The catalyst supported on un-oxidized carbon exhibits activation overpotential of 470 mV oxygen reduction. The diffusion-limited plateau of the polarization curve for K1-CoEDA(HT), shown in FIG. 2a, is not well-defined as is usually observed with the Pt catalysts. The model proposed by Jiang et al. shows that the plateau is more inclined when the distribution of active sites is less uniform and the reaction is slower. However, with the use of $HNO_3$ treated oxidized carbon, activity towards oxygen reduction increases. A single steep reduction wave with a well-developed limiting plateau similar to that of Pt catalysts is observed. The activation overpotential for oxygen reduction on K2-CoEDA(HT) decreases by 60 mV compared to K1-CoEDA(HT). FIG. 2b gives the ring currents as a function of the disk potential of the two catalysts. The ring currents on K2-CoEDA(HT) are less than on K1-CoEDA(HT). This suggests that the selectivity of the catalyst to the four-electron reduction of oxygen to water is increased on oxidized carbon. Another interesting feature is the shape of the ring currents on both the samples. The ring current is a function of the potential and goes through a maximum. Oxygen reduction reaction is potential-dependent. Potential-dependent selectivity of the oxygen reduction reaction on iron porphyrin has been studied previously. The shape of the ring currents of iron porphyrin catalysts studied in that literature reference are similar to the ones obtained in cobalt chelate catalysts in our work.

$O_2$ reduction follows the general scheme shown below in equation 1.

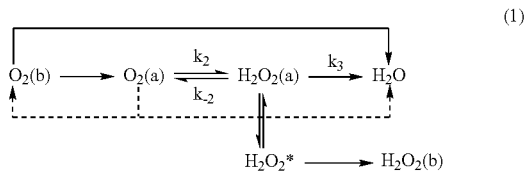

(1)

Indices a, *, b indicate adsorbed, in the vicinity of the disk electrode and in the bulk respectively. At high potentials $k_1/k_2$ is constant with $k_1 > k_2$ indicating a direct reduction of oxygen to water than the 2 electron reduction to peroxide. At intermediate potentials $k_1/k_2$ ratio is falling indicating an increase in the 2 electron reduction to peroxide. At lower potentials $k_1/k_2$ becomes lower than 1. However, $k_3$ increases resulting in a further reduction of peroxide to water before it escapes into the solution.

Nitrogen fixation on carbon from nitrogen containing precursors increase with the amount of oxygen surface groups, with one atom of nitrogen being added for every oxygen atom in the quinone structure. Such quinone groups form acidic sites on the carbon surface which favor the absorption of the basic CoEDA complex. This phenomenon results in an increase in dispersion of the catalyst. TEM images of heat treated CoEDA samples supported on oxidized carbon and un-oxidized carbon were made. The average particle size along with the standard deviation is given in Table 1. The average particle size of the catalyst supported on K1 is 23.7 nm while the particle size for the catalyst loaded on K2 support is 9.5 nm. Thus, the surface quinone groups cause a better dispersion of the CoEDA complex. By increasing the number of oxygen groups on the carbon support, the dispersion of the catalysts, as well as their ultimate performance, is increased.

A5: Effect of Carbon Surface Area and Pore Size Distribution

The effect of surface area and pore size distribution of the carbon support on the activity of heat treated CoEDA catalysts was studied using three commercial carbons, namely Ketjen Black EC-300 J, Vulcan XC-72 and Black Pearl 2000.

Figure 3A:
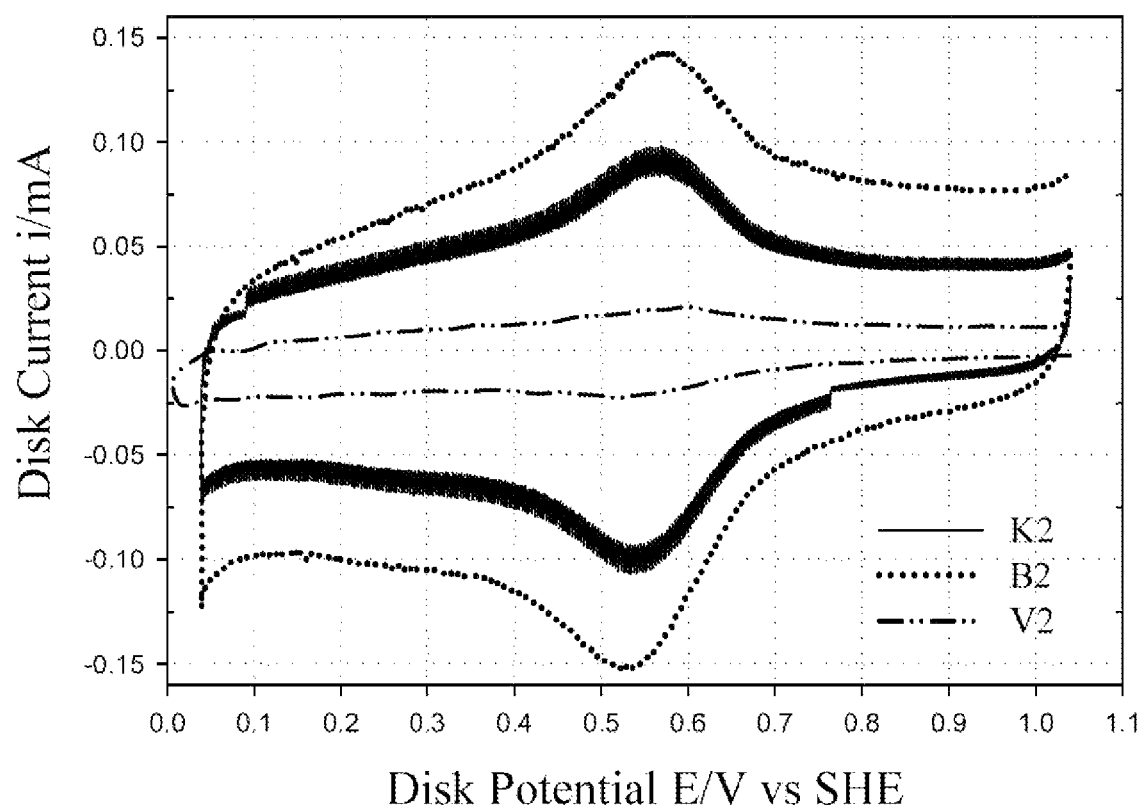
FIG. 3 is a a) typical cyclic voltammograms of oxidized carbon K2, B2 and V2 in 0.5 M $H_2SO_4$ saturated with $N_2$. Scan rate 5 mVs$^{-1}$, rotation rate 0 rpm, and polarization curves of heat treated CoEDA samples supported on K2, B2 and V2 in 0.5 M $H_2SO_4$ solution saturated with oxygen b) disk currents. c) Ring currents. Scan rate 5 mVs$^{-1}$, rotation rate 900 rpm.

The total specific surface areas, mesopore areas and micropore areas of the as-received carbon supports are summarized in Table 2. The carbon supports were pre-washed in HCl and oxidized with $HNO_3$ as explained in the experimental section. The oxidation of carbon results only in a slight decrease in surface area and hence will not alter the distribution of the pores to a large extent (and hence the proportion of mesopores). Thus, the comparisons of the carbon surface area and the pore size distribution are based on the values for as-received carbons (K, V, and B). FIG. 3a shows the cyclic voltammograms of the oxidized carbons K2, B2 and V2 in nitrogen atmosphere. The redox peaks of quinone-hydroquinone couple are well-pronounced in B2 and K2 compared to V2. Nitric acid oxidation attacks the relatively weak sites of the carbon structure which occurs at the edges of the basal planes. However, only the mesopores with pore diameters of 2-50 nm are accessible to nitric acid oxidation since they possess a combination of high surface area and large pore diameter. The area inside the micropores with a diameter smaller than 2 nm is inaccessible for nitric acid oxidation. Hence, higher surface area does not necessarily mean higher number of such oxidation-prone sites. As shown in Table 2, the surface area of Black Pearl 2000 is higher than that of Ketjen Black EC 300 J followed by Vulcan XC-72. The increase in the surface area in Black Pearl 2000 compared to Ketjen Black EC 300 J results from the increase of the area inside the micropores (720 $m^2/g$). Since, as discussed above, the micropores are not accessible for nitric acid oxidation, the amount of quinone groups in acid treated B2 does not increase when compared with that of K2.

Figure 3B:
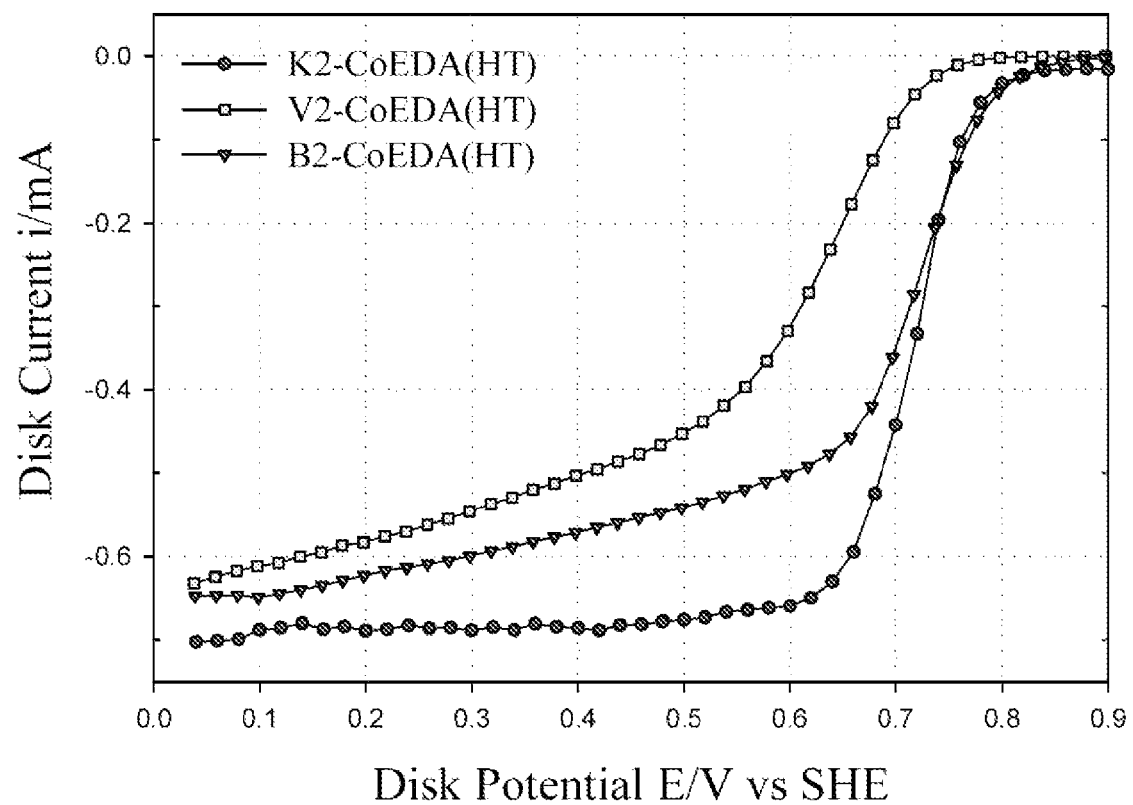
Figure 3C:
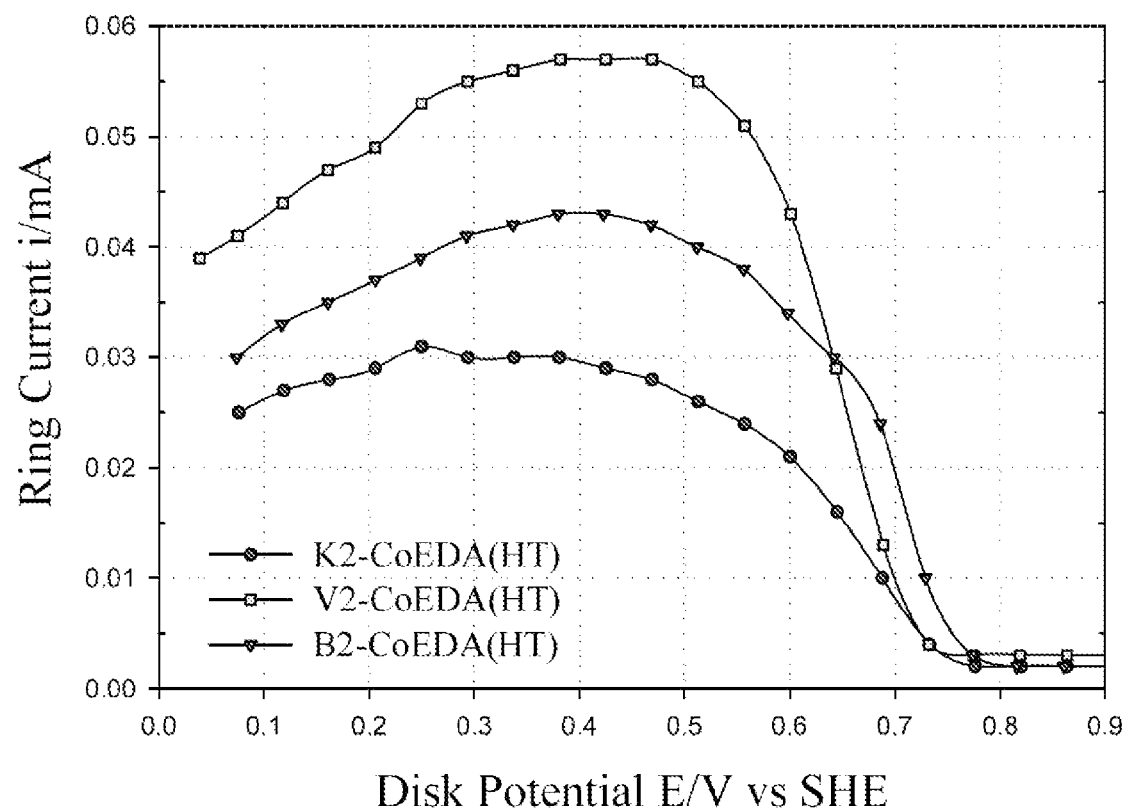

FIG. 3b shows polarization curves in 0.5 M $H_2SO_4$ of CoEDA complex loaded on the three oxidized carbons and heat treated to obtain the catalysts K2-CoEDA(HT), B2-CoEDA(HT) and V2-CoEDA(HT). The activity of the heat treated catalyst decreases as follows on the oxidized carbons: K2>B2>V2. Also, a comparison of the ring currents as shown in FIG. 3c indicates that the ring currents decrease with the increase of the amount of quinone groups as given by the CVs in $N_2$ in FIG. 3a. Also the shape of the ring currents is similar to those in FIG. 2b. Thus the higher the amount of quinone groups, the higher the selectivity to the four-electron reduction of oxygen to water. The catalyst performance increases with increased dispersion of the catalyst which increases with the amount of quinone groups on carbon surface.

TEM images provide supporting evidence that the average particle size of cobalt in K2-CoEDA(HT) is 9.5 nm compared to 12.5 nm for B2-CoEDA(HT) and 40 nm for V2-CoEDA (HT). The bigger particle size is due to a decrease of quinone groups resulting from a decreased mesopore area.

The charge under the peaks of the nitrogen CVs corresponding to quinone/hydroquinone couple was calculated and it turns out to be that, among the oxidized carbons, Ketjen has slightly higher charge (after background subtraction). The charge under the peaks are 0.00039053 C, 0.0020854 C, 0.002029 C, 0.0 C for V2, K2, B2 and K1 respectively. The lower particle size in the case of catalysts loaded on K2 compared to that on V2 and B2 is due to the higher peak area observed on K2. However, the very small difference in the calculated charges between Black Pearl and Ketjen does not warrant this conclusion. Higher mesopore area in Ketjen itself can be another reason why CoEDA on Ketjen shows a smaller particle size. This can be further substantiated by comparing the particle size of CoEDA on oxidized Vulcan XC-72, V2 (with lower mesopore area) to that on un-oxidized Ketjen Black EC 300 J, K1 (with higher mesopore area). The average particle size of V2-CoEDA is 40 nm and that of K1-CoEDA is 23.7 nm. Thus, both the number of the oxygen groups and the mesoporous area contribute to the increase in the dispersion of the catalyst.

A6: Role of O, N and Co on Active Site

Figure 4A:
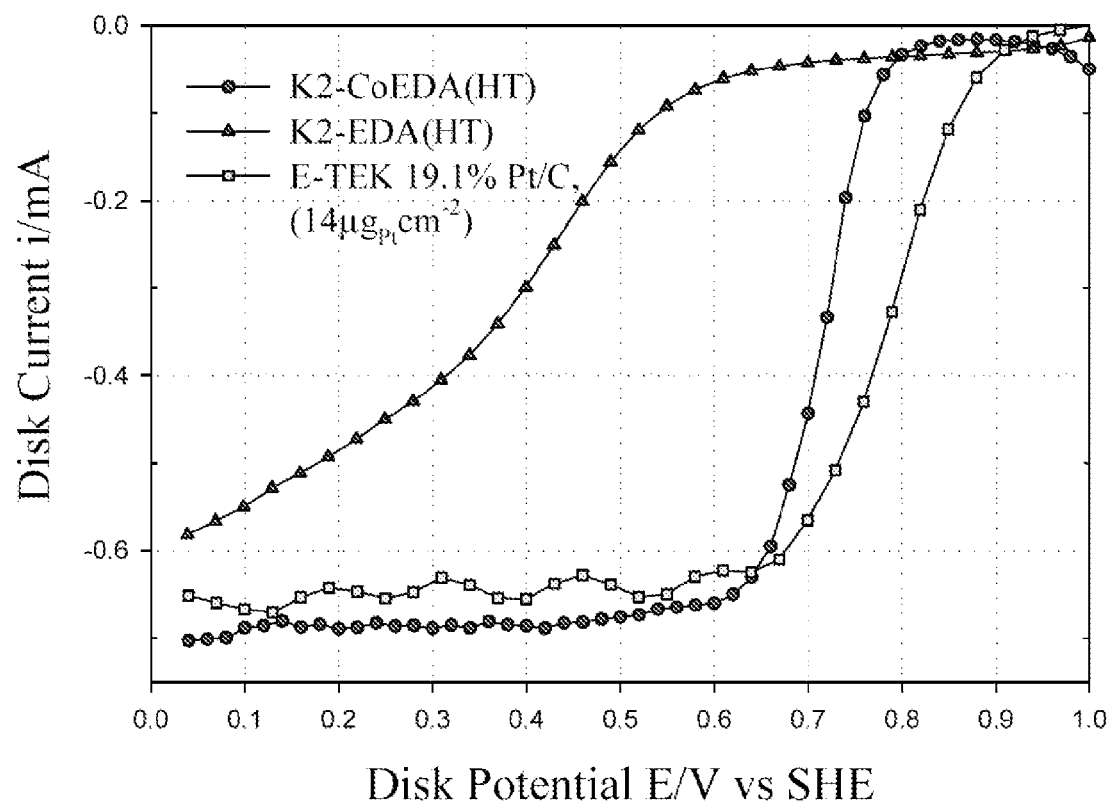
FIG. 4 is a polarization curves for K2-EDA(HT) and K2-CoEDA(HT) samples compared to that of commercial E-TEK 20% Pt/C catalysts in 0.5 M $H_2SO_4$ solution saturated with oxygen. a) Disk currents. b) Ring currents. Disk Potential scanned at 5 mVs$^{-1}$ scan rate, rotation rate 900 rpm.
Figure 4B:
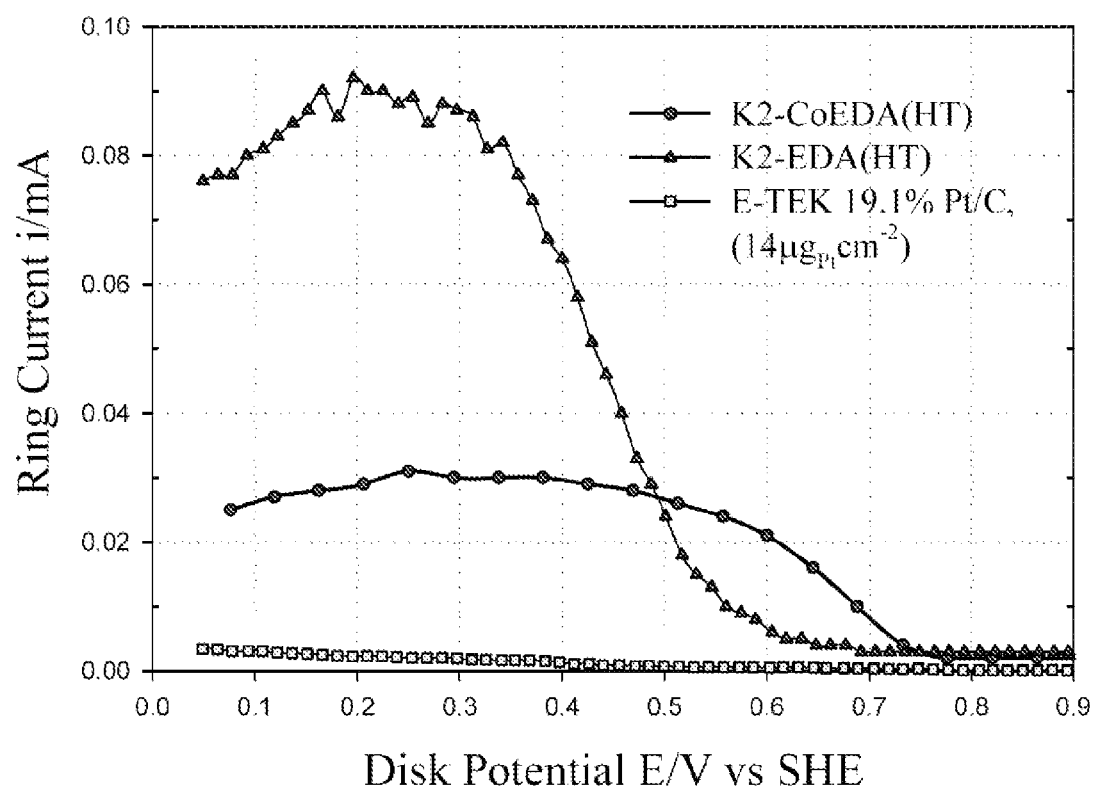
Figure 5A:
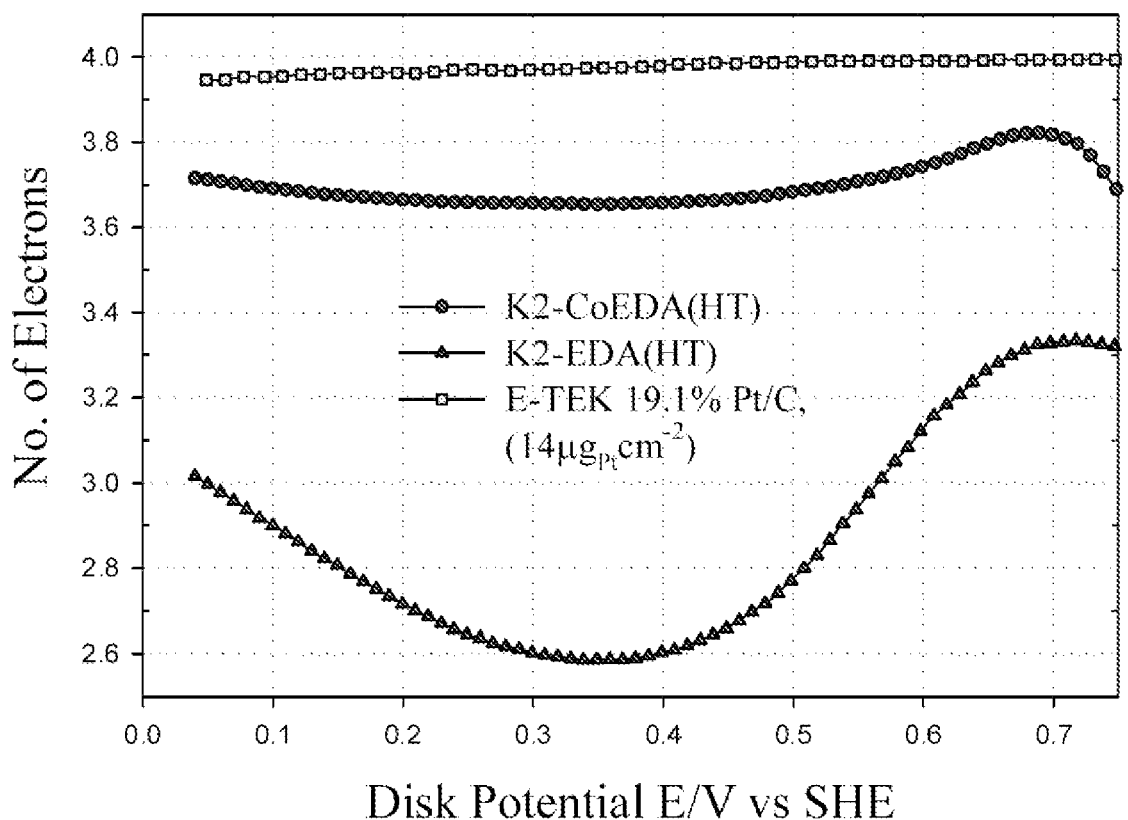
FIG. 5 is a a) No. of electrons and b) Percentage peroxide produced calculated from equations (1) and (2) for the catalysts compared in FIG. 6.
Figure 5B:
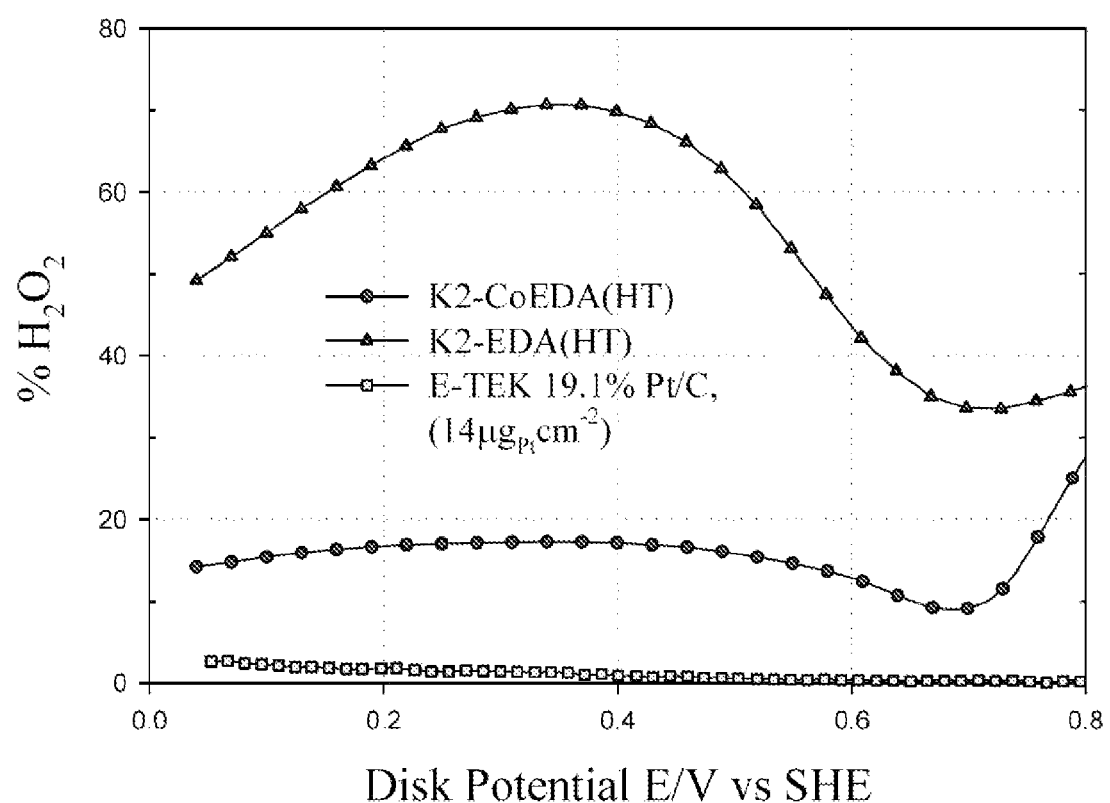

FIG. 4a shows the polarization curves for K2-EDA(HT) and K2-CoEDA(HT) catalysts on a disk electrode in 0.5 M $H_2SO_4$ saturated with oxygen. The performance of K2-CoEDA(HT) and K2-EDA(HT) catalysts is compared with the E-TEK 19.1% Pt/C (14 $\mu g_{Pt} cm^{-2}$). The ring currents were measured to estimate the amount of hydrogen peroxide produced during oxygen reduction. In addition to the increase in dispersion of the CoEDA, the surface oxygen group appears to play an important role in the generation of active sites for oxygen reduction, as shown by the polarization curves in FIG. 1a. Further introduction of nitrogen groups, by ethylene diamine adsorption on K2 followed by heat treatment, decreases the activation overpotential towards oxygen reduction by 300 mV. With the incorporation of cobalt in the catalyst, a drastic increase in activity towards oxygen reduction is observed. The on-set potential for oxygen reduction is as high as +820 mV vs. SHE. The catalyst shows less than 100 mV higher overpotential for oxygen reduction in comparison to E-TEK 19.1% Pt/C catalyst. The single steep reduction wave with a well-defined diffusion limited plateau indicates the improved kinetics of the K2-CoEDA(HT) catalyst. FIG. 4b gives the ring currents of the catalysts whose disk currents are given in FIG. 4a. The ring currents were measured to estimate the amount of hydrogen peroxide produced during oxygen reduction. The ring current for K2-EDA(HT) is higher illustrating the large quantity of hydrogen peroxide generated. After addition of Co, the ring current decreases drastically indicating a decrease of the amount of hydrogen peroxide produced. The number of electrons transferred (n) and the percentage of peroxide produced (% $H_2O_2$) can be determined by the following equations:

$$n = 4I_D/(I_D + I_R/N) \quad (2)$$

$$\% \, H_2O_2 = 100(4-n)/2 \quad (3)$$

where N, $I_D$ and $I_R$ are the collection efficiency, disk current and ring current, respectively. We assumed the collection efficiency to be constant at a theoretical value of 0.39 for all the catalysts studied. FIGS. 5a and 5b give n and % $H_2O_2$ of the three catalysts K2-EDA(HT), K2-CoEDA(HT) and commercial E-TEK 19.1% Pt/C-14 $\mu g_{Pt} cm^{-2}$. It is clearly seen that with Co addition the number of electrons transferred during the oxygen reduction reaction is more than 3.6, and the amount of peroxide produced is less than 20% for most of the potential range examined. Thus, with the addition of the transition metal, the selectivity to the four-electron reduction of oxygen is increased.

Figure 6A:
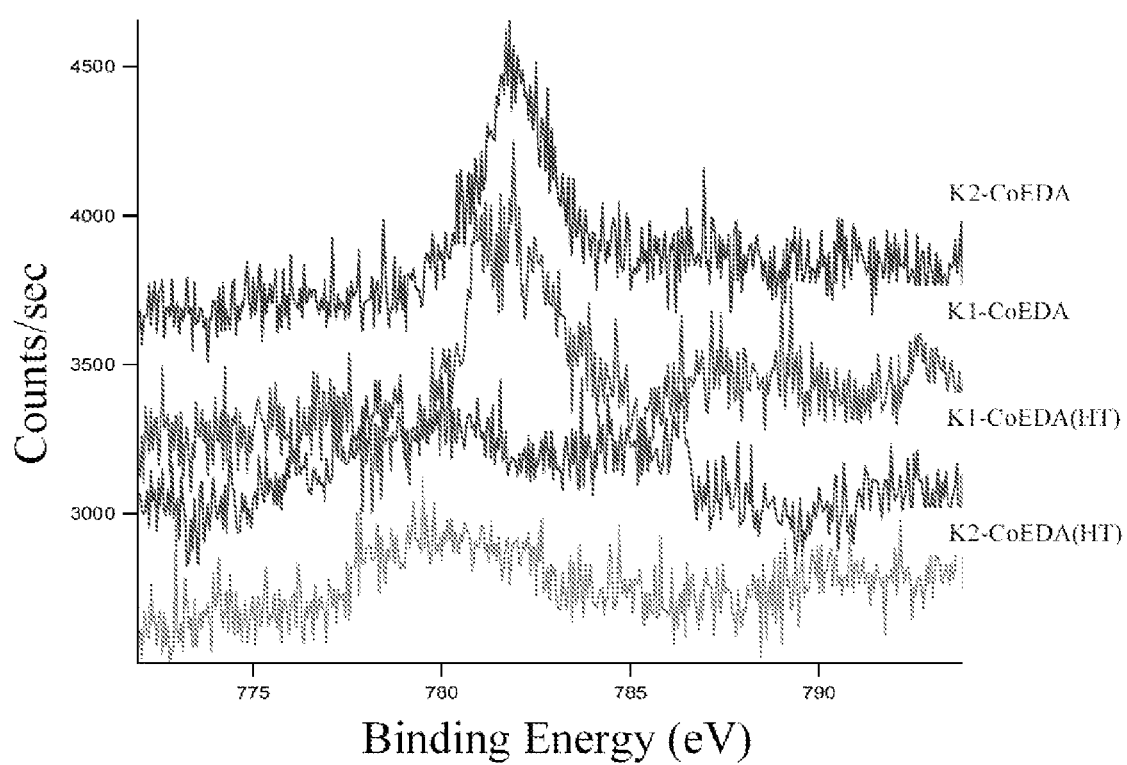
FIG. 6 is a XPS spectra in a) Co 2p, b) N 1s, c) O 1s regions of the samples K1, K2, K1-CoEDA, K2-CoEDA, K1-CoEDA (HT), K2-CoEDA (HT)

A7: XPS Measurements:

XPS measurements were carried out to examine the changes in surface chemical states due to chemical and heat treatments. An attempt was also made to identify the active surface sites. Samples K1, K2, K1-CoEDA, K2-CoEDA, K1-CoEDA(HT) and K2-CoEDA(HT) were analyzed. FIG. 6a shows the $Co(2p_{3/2})$ spectra for the samples K1-CoEDA, K2-CoEDA, K1-CoEDA(HT) and K2-CoEDA(HT). For as-prepared samples, the $Co(2p_{3/2})$ peak has a binding energy of approximately 782 eV, which is attributed to Co in a high oxidation state; metallic Co has a binding energy of 777.9 eV, while CoO and $Co_2O_3$ have binding energies of 780 eV and 779.4 eV, respectively. After the heat treatment, the shift in the $Co(2p_{3/2})$ peaks to lower binding energies indicates that Co becomes more reduced during this process. The loss of Co signal after heating is consistent with previous reports in the literature indicating that the Co becomes encapsulated with carbon upon heating.

Figure 6B:
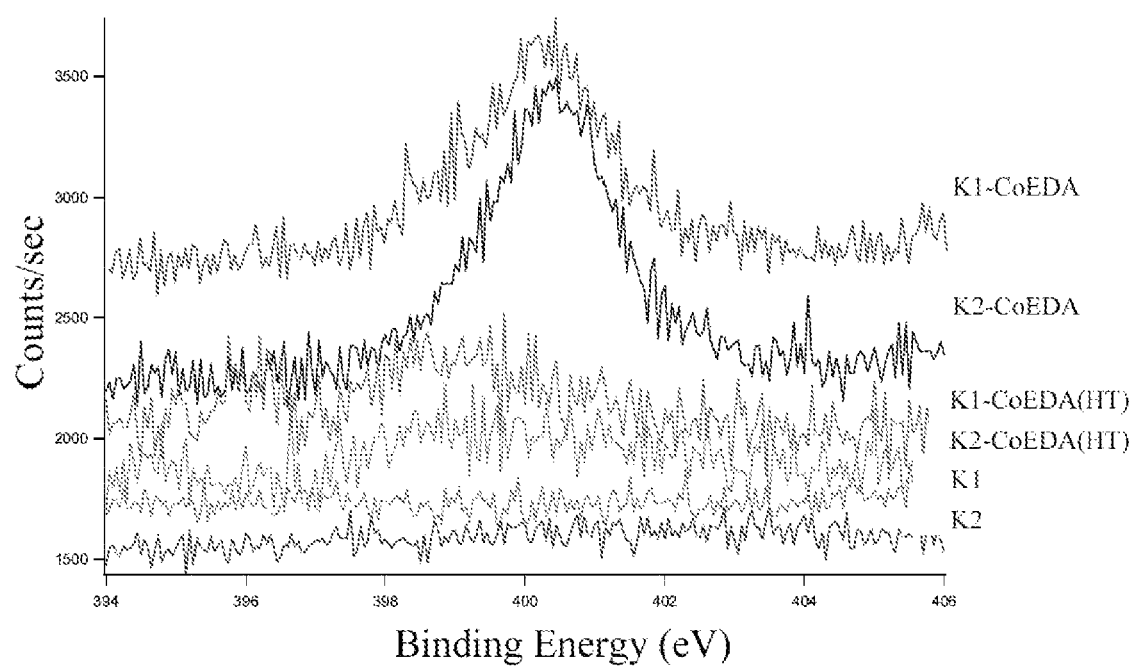

FIG. 6b shows the XPS spectra for the N(1s) region for the as-prepared and heat-treated samples on various carbon supports. As expected, no nitrogen was detected on the carbon supports before exposure to CoEDA. The presence of nitrogen on the carbon supports was initially detected following treatment with CoEDA, but the intensity of the nitrogen signal decreased almost to zero after the heat treatment, and the shift to lower binding energies indicates a reduction in the nitrogen species.

Figure 6C:
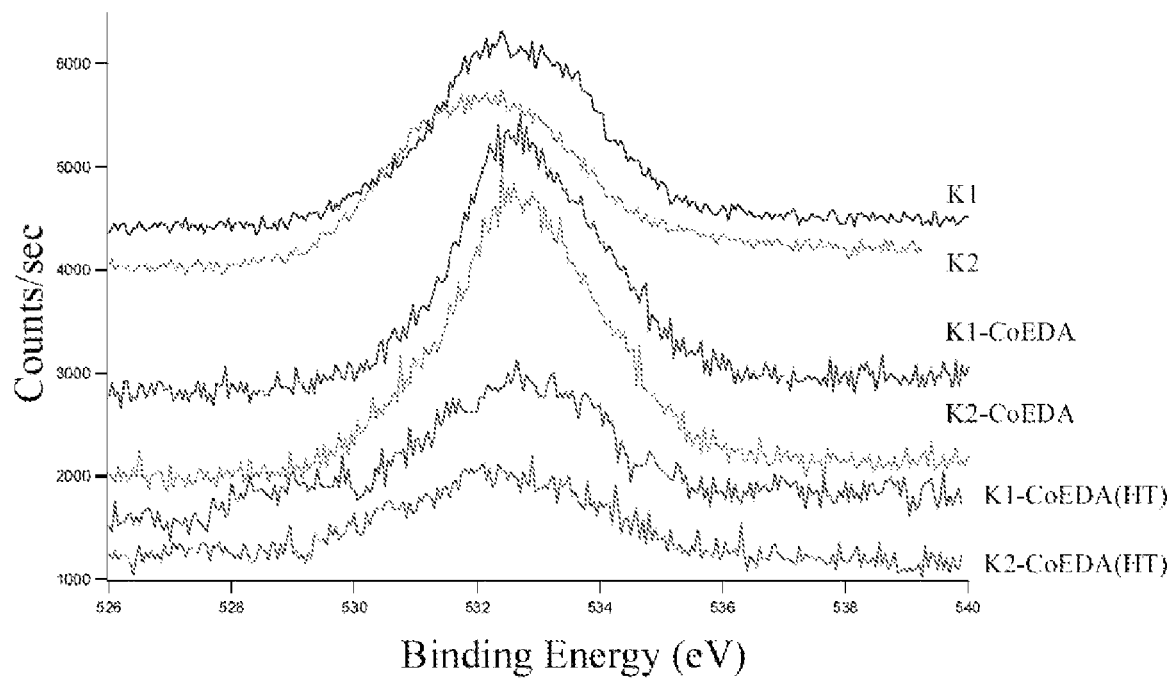

The O(1s) spectra in FIG. 6c show that $HNO_3$ treatment does not substantially increase the amount of surface oxygen on the carbon support, besides the fact that the nature of the oxygen species is slightly different as demonstrated by the shift in O(1s) binding energies between the spectra for K1 and K2. This is consistent with the electrochemical results where quinone type groups were observed on K2 and not in K1. On both supports, treatment with CoEDA introduces more surface oxygen with higher binding energies. Subsequent heating to 800° C. removes approximately 50-70% of the surface oxygen from the carbon supports and this loss of surface oxygen is consistent with the decrease in oxidation state for the cobalt. Similar to the supports K1 and K2, catalysts K1-CoEDA(HT) and K2-CoEDA(HT) show a slight difference in O(1s) binding energy, probably due to the presence and absence of quinone groups in K2 and K1 respectively as observed by the cyclic voltammograms in FIG. 1b.

Regarding the C(1s) region (data not shown), the K1 and K2 supports exhibit similar spectra with a main peak at ~284.3 eV, a binding energy that has been observed for a number of other carbon supports such as Norit SX Ultra and Vulcan SC-72R. The addition of CoEDA results in a peak shift to higher binding energies (285-285.5 eV) due to the presence of carbon in the ethylene diamine complex. However, after heating the CoEDA-treated samples, the resulting spectra are again similar to that of the K1 and K2 supports.

In summary, chemical nature and concentrations of cobalt, nitrogen and oxygen species observed on the two carbon supports are similar to each other before and after treatment with CoEDA, as well as after heating. On both supports, the heat treatment decreases the surface concentration of cobalt, nitrogen and oxygen, and this could be attributed to diffusion of these species into the carbon support or desorption of gaseous nitrogen and oxygen-containing species during heating. Furthermore, the cobalt becomes more reduced upon heating. Thus a reduced cobalt species (closer to the metallic state) and quinone groups contribute to the observed electrochemical activity.

Electrochemical techniques were used to characterize the performance of CoEDA catalyst supported on various carbon supports. The influence of oxygen surface groups, surface area and pore size distribution on the catalyst activity has been investigated. Nitric acid treatment introduces quinone groups on the surface of carbon. The quinone groups favor absorption of amines, leading to an increase in dispersion of the cobalt-chelate catalyst, and hence its activity towards ORR. The amount of quinone group increases with the mesoporous area which causes the K2-CoEDA(HT) catalyst to have the highest activity. Introduction of cobalt increases the catalytic activity and favors oxygen reduction via four electron process. In addition to increasing the dispersion of the catalyst, the presence of quinone oxygen groups enhances the formation of catalytic centers on the carbon support.

B-1. Preparation of Carbon-based Catalysts

Below are the details of each step involved in the synthesis of carbon-based catalysts:

(i) Preparation of metal-free catalysts (activated carbon support): The first step for metal-free catalyst preparation involves dematerialization (i.e. removal of metal impurities in carbon). A desired amount of carbon powder (e.g. Vulcan, Ketjen black and Black Pearl) was dispersed in an aqueous HCl solution, followed by vigorous stirring. The carbon powder was then allowed to settle and the solution was decanted.

The second step involves the introduction of oxygen functional groups (e.g. quinone groups) onto the carbon surface. The HCl-treated carbon was refluxed in $HNO_3$ at elevated temperatures. The third step involves the introduction of nitrogen functional groups (e.g. pyridinic, graphitic and pyrrolic groups) on the carbon surface. The nitrogen functional groups were introduced through a polymerization process of nitrogen donor followed by a high-temperature pyrolysis. The nitrogen precursors include melamine, urea, thio-urea and selenourea, and they were polymerized to yield melamine formaldehyde, urea formaldehyde, thio-urea formaldehyde and selenourea formaldehyde, respectively. The final step involves the pyrolysis of the polymerized carbon in an inert atmosphere at temperatures between 600 to 1000° C., in order to incorporate and stabilize the nitrogen functional groups in the carbon matrix. The activity, selectivity and stability of the catalyst were optimized as a function of surface oxygen group, nitrogen content and precursor, carbon support, porosity and pore size distribution, pyrolysis temperature and time and non-metallic additive (e.g. S, Se and Te).

(ii) Preparation of carbon composite catalysts: The first step for carbon composite catalyst preparation involves the deposition of metal and nitrogen precursors on the carbon support. In the present invention, activated metal-free catalyst was used as a support for carbon composite catalyst, but other carbon black powders can be utilized. Desired amounts of cobalt hexahydrate and iron sulfate heptahydrate were dissolved in an ethanol solution containing the carbon powder in such a way that the metal concentration is 20 to 40 wt %. Metal precursors are not limited to Co and Fe, but other transition metals such as Cr, Cu, Ni, V, etc. can be utilized in the present invention. Nitrogen precursor (e.g. ethylene diamine and propylene diamine) was added to the solution in such a way that the metal to nitrogen (atomic) ratio is 1:5 to 1:20. The mixture was refluxed at elevated temperatures.

The second step involves thermal and chemical post-treatments. The catalyst specimen was pyrolyzed in an inert atmosphere at temperatures between 600 and 1000° C., then treated with $H_2SO_4$ at temperatures between 25 and 90° C., in order to dissolve out the metals on the carbon surface and finally pyrolyzed in an inert atmosphere at temperatures between 600 and 1000° C.

B-2. Results and Discussion

The RRDE experiments in 0.5 M $H_2SO_4$ solution saturated with oxygen indicated that the as-received carbon does not show any catalytic activity towards ORR, but remarkable increase in the catalytic activity can be achieved with the introduction of nitrogen functional groups. The optimized carbon composite catalyst shows an onset potential for ORR as high as 0.87 V(NHE) and also a well-defined diffusion limiting current which is only observed in Pt-based catalysts. The optimized catalyst catalyzes ORR via four-electron pathway with producing no $H_2O_2$ at 0.5 V(NHE). Notice that Pt catalyst generates 1 to 2% $H_2O_2$.

The fuel cells were tested at 75° C. with $H_2$(30 psi)/$O_2$(40 psi) using the optimized carbon composite catalyst. The results showed the current densities of 1.1 A $cm^{-2}$ at 0.4 V and 2.3 A $cm^{-2}$ at 0.2 V for a catalyst loading of 6 mg $cm^{-2}$, which are superior to the fuel cell performances with Pt-free catalysts reported in the literature. The optimized carbon composite catalyst showed no degradation of fuel cell performance even for 350 h of continuous operation.

The transmission electron microscopy images did not show any metal traces on the surface of the synthesized carbon composite catalyst. The X-ray photoelectron spectroscopic study indicated that pyridinic and graphitic nitrogen functional groups are responsible for the catalytic activity of carbon-based catalysts toward ORR. The pyridinic nitrogen possesses one lone pair of electrons in addition to the one electron donated to the conjugated $\pi$ bond system. It shows strong Lewis basicity ($\pi$ electron delocalization) and hence facilitates reductive $O_2$ adsorption. The pyrolysis in the presence of nitrogen-containing metal compounds followed by post-treatments greatly increased the concentrations of pyridinic and graphitic nitrogen functional groups on the catalyst surface, thereby enhancing the catalytic activity, selectivity and stability. That is, in the present invention, the transition metal was utilized as a catalyst for formation of nitrogen-rich active reaction sites during the high-temperature pyrolysis.

The catalyst of the present disclosure can be utilized as a cathode electrocatalyst in a PEM fuel cell. Such a fuel cell could be utilized for various applications, including power sources for electric vehicles. In such electric vehicles, high power output and stability of fuel cells are of great importance, and the cathode catalyst of the present disclosure is advantageous in that regard.

TABLE 1

| Sample | Average Particle Size (nm) | Standard Deviation (nm) |
| --- | --- | --- |
| K1-CoEDA(HT) | 23.7 | 24.5 |
| K2-CoEDA(HT) | 9.5 | 3.8 |
| B2-CoEDA(HT) | 12.5 | 8.4 |
| V2-CoEDA(HT) | 40 | 12 |

TABLE 2

| Carbon | Area ($m^2/g$) | Micropores ($m^2/g$) | Mesopores ($m^2/g$) |
| --- | --- | --- | --- |
| Ketjen Black | 886 | 55 | 680 |
| Vulcan XC 72 | 254 | 118 | 100 |
| Black Pearl 2000 | 1500 | 720 | 540 |

The invention claimed is:

1. A method of producing a composite carbon catalyst, the method comprising:
   providing a carbon precursor;
   oxidizing the carbon precursor;
   refluxing the oxidized carbon precursor with a non-platinum transitional metal precursor in a solution; and
   pyrolyzing the solution at a temperature of at least about 500° C.

2. A method as in claim 1, wherein the carbon precursor comprises carbon black.

3. A method as in claim 1, wherein the step of oxidizing the carbon precursor is performed by refluxing the carbon precursor in the presence of an oxidizing agent, wherein the oxidizing agent comprises nitric acid.

4. A method as in claim 1 further comprising adding nitrogen functional groups to the oxidized carbon precursor prior to refluxing the oxidized carbon precursor with a non-platinum transitional metal.

5. A method as in claim 4, wherein the nitrogen functional groups are provided by polymerizing a nitrogen source in the presence of the oxidized carbon precursor.

6. A method as in claim 5, wherein the nitrogen source comprises melamine, urea, thio-urea, selenourea, or combinations thereof.

7. A method as in claim 1, wherein the metal of the non-platinum transitional metal precursor comprises cobalt, iron, chromium, copper, nickel, or vanadium.

8. A method as in claim 1, wherein the non-platinum transitional metal precursor comprises a metal chelate.

9. A method as in claim 8, wherein the metal chelate has a structure of the formula $MN_4$, wherein M is the metal and N is the nitrogen atom chelated with the metal.

10. A method as in claim 9, wherein the non-platinum transitional metal precursor comprises cobalt ethylene diamine or cobalt propylene diamine.

11. A composite carbon catalyst made according to the method of claim 1.

12. A method of producing a composite carbon catalyst, the method comprising:
    providing a carbon precursor comprising carbon black;
    oxidizing the carbon precursor;
    adding nitrogen functional groups to the oxidized carbon precursor;
    refluxing the oxidized carbon precursor with a non-platinum transitional metal precursor in a solution; and
    pyrolyzing the solution at a temperature of at least about 500° C.

13. A method as in claim 12, wherein the step of oxidizing the carbon precursor is performed by refluxing the carbon precursor in the presence of an oxidizing agent, wherein the oxidizing agent comprises nitric acid.

14. A method as in claim 12, wherein the nitrogen functional groups are provided by polymerizing a nitrogen source in the presence of the oxidized carbon precursor.

15. A method as in claim 14, wherein the nitrogen source comprises melamine, urea, thio-urea, selenourea, or combinations thereof.

16. A method as in claim 12, wherein the metal of the non-platinum transitional metal precursor comprises cobalt, iron, chromium, copper, nickel, or vanadium.

17. A method as in claim 12, wherein the non-platinum transitional metal precursor comprises a metal chelate.

18. A method as in claim 12, wherein the metal chelate has a structure of the formula $MN_4$, wherein M is the metal and N is the nitrogen atom chelated with the metal.

19. A method as in claim 12, wherein the non-platinum transitional metal precursor comprises cobalt ethylene diamine or cobalt propylene diamine.

20. A method of producing a composite carbon catalyst, the method comprising:
    providing a carbon precursor comprising carbon black;
    oxidizing the carbon precursor with an oxidizing agent, wherein the oxidizing agent comprises nitric acid;
    adding nitrogen functional groups to the oxidized carbon precursor, wherein the nitrogen functional groups are provided by polymerizing a nitrogen source in the presence of the oxidized carbon precursor;
    refluxing the oxidized carbon precursor with a non-platinum transitional metal precursor in a solution, wherein the metal of the non-platinum transitional metal precursor comprises cobalt, iron, chromium, copper, nickel, or vanadium, and wherein the non-platinum transitional metal precursor comprises a metal chelate; and
    pyrolyzing the solution at a temperature of at least about 500° C.

* * * * *